United States Patent [19]

O'Neall et al.

[11] Patent Number: 5,222,324
[45] Date of Patent: Jun. 29, 1993

[54] CROP SPRAYING SYSTEM

[76] Inventors: Donald L. O'Neall, Rte. 1, Box 165, Downs, Ill. 61736; John R. Sandford, P.O. Box 207, Loda, Ill. 60948

[21] Appl. No.: 659,860

[22] Filed: Feb. 21, 1991

[51] Int. Cl.$^5$ .............................................. A01C 1/00
[52] U.S. Cl. ............................... 47/1.7; 250/222.1
[58] Field of Search ........................ 47/1.7, 1.01; 250/201.5, 222.1

[56] References Cited

U.S. PATENT DOCUMENTS

| | | | |
|---|---|---|---|
| 3,959,924 | 6/1976 | Allen | 47/1.7 |
| 4,206,569 | 6/1980 | Randolph | 47/1.7 |
| 4,378,491 | 3/1983 | Lehman | 250/201.5 |
| 4,408,414 | 10/1983 | Lehle | 47/1.01 |
| 4,607,452 | 8/1986 | Maw | 47/1.01 |
| 4,709,505 | 12/1987 | Lempa | 47/1.7 |
| 4,726,587 | 2/1988 | Fitch | 250/222.1 |
| 4,947,579 | 8/1990 | Harrison | 47/1.01 |
| 4,991,341 | 2/1991 | Douglas | 47/1.7 |
| 5,086,582 | 2/1992 | Hamilton | 47/1.7 |

OTHER PUBLICATIONS

*Prototype Sprayer Seeks Out Weeds,* Tom Beckman, Dec. 4, 1990 issue of "Prairie Farmer".

*Primary Examiner*—Henry E. Raduazo
*Attorney, Agent, or Firm*—Emrich & Dithmar

[57] ABSTRACT

A crop spraying system adapted for attachment to an implement frame pulled by a traction vehicle employs a spray nozzle for each crop row in combination with a photo detector arrangement for sensing the presence of weeds or other unwanted plants extending above the crop height. Following detection of a weed in a crop row, a controller momentarily turns on a spray nozzle covering that row after a selected time interval depending upon traction vehicle speed and detector-spray nozzle spacing for applying a herbicide to the detected weed. Operating in the near infrared (IR) band, the crop spraying system allows for selected spraying of oversized, unwanted plants in the crop row in reducing herbicide usage, and thus cost, and minimizing the environmental impact of such chemicals. One embodiment employs an IR beam bending reflector arrangement to detect not only weeds extending above the crop height, but also weeds extending laterally beyond the crop row into the inter-row space.

14 Claims, 2 Drawing Sheets

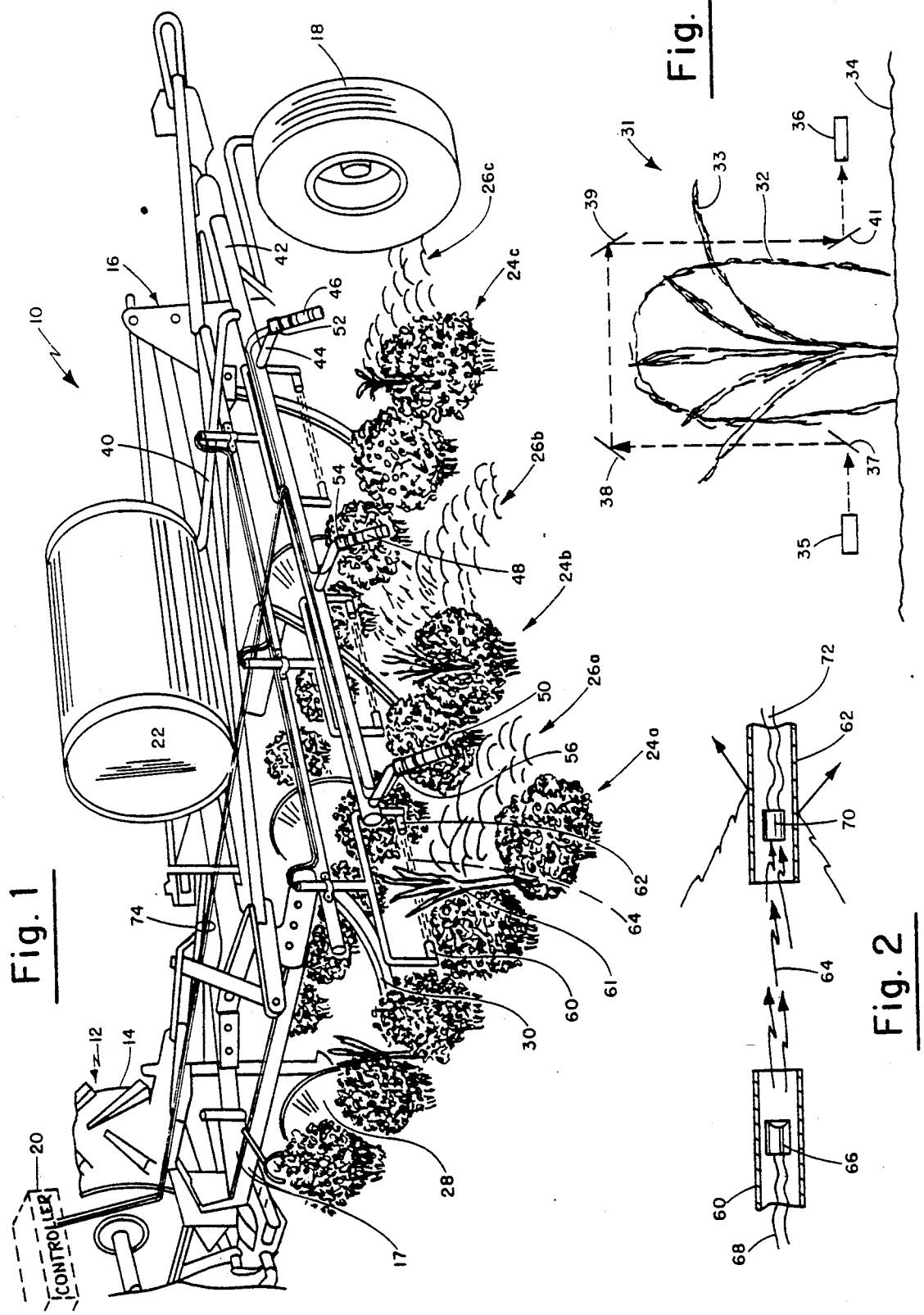

CROP SPRAYING SYSTEM

FIELD OF THE INVENTION

This invention relates generally to agricultural crop spraying and is particularly directed to a crop spraying system which detects and sprays with a herbicide only unwanted plants, such as weeds, in a crop row.

BACKGROUND OF THE INVENTION

Crop spraying is a widespread method for protecting crops from pests as well as for restricting the growth of other, competing forms of plants such as weeds. In applying a herbicide for restricting the growth of other, competing forms of plants, the herbicide is generally mixed with water or in some cases vegetable oils for discharging the mixture under pressure through a hydraulic nozzle. The mixture is widely dispersed in the form of small droplets. The nozzle is typically provided with one or more apertures through which the herbicide is directed under the control of a valve.

The herbicide is generally applied in a continuous manner along the entire length of each crop row. There are several disadvantages to this approach. First, it is expensive, requiring large amounts of increasingly expensive herbicides. Environmentally it is undesirable and sometimes even dangerous, particularly in those areas where the herbicide after repeated spraying over several years tends to saturate the soil and possibly contaminate ground water. Finally, applying a herbicide to crop plants is undesirable and may be unhealthy not only for the plant itself, but also for those who consume the plant product. The present invention provides an improved crop spraying system which eliminates the aforementioned problems of the prior art.

OBJECTS AND SUMMARY OF THE INVENTION

Accordingly, it is an object of the present invention to provide an improved crop spraying arrangement which affords environmental and economic advantages.

Another object of the present invention is to identify weeds or other undesirable plants in a crop row and then to apply a herbicide only to the targeted weeds in minimizing over-spray on the crop.

Yet another object of the present invention is to provide an optical detector for an agricultural sprayer for identifying and spraying only targeted plants such as weeds in a crop row.

A further object of the present invention is to provide an aligned optical system adapted for attachment directly to a traction vehicle or to an agricultural implement frame pulled by a traction vehicle for use in timed relation with a sprayer nozzle for detecting and spraying only oversized, unwanted plants such as weeds in a crop row.

This invention is intended for use on a frame structure pulled by a traction vehicle, and comprises apparatus for spraying an unwanted plant in a row of crop plants with a herbicide, wherein the unwanted plant is larger than the crop plants, the apparatus comprising: a tank containing a herbicide; a spray nozzle mounted to the frame structure and connected to the tank for receiving the herbicide; an optical sensor mounted to the frame structure forward of the spray nozzle and positioned adjacent to the crop row for detecting an unwanted plant and outputting a signal upon detection of an unwanted plant; and a controller coupled to the spray nozzle and to the sensor and responsive to the signal from the sensor for momentarily actuating the spray nozzle for spraying the unwanted plant with the herbicide, wherein the controller includes a delay timer for delaying the spraying of the unwanted plant a predetermined time period determined by the speed of the traction vehicle and the spacing between the spray nozzle and the optical sensor.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a perspective view of a portion of a tractor-drawn implement frame incorporating a crop spraying system in accordance with the present invention;

FIG. 2 is a sectional view of a photo diode and photo transistor arrangement employed in the infrared detector of the crop spraying system;

FIG. 3 is a view taken along the length of a crop row illustrating an oversized, unwanted plant in the crop row and an infrared beam arrangement for detecting the plant in one embodiment of the present invention.

DETAILED DESCRIPTION OF THE PREFERRED EMBODIMENT

Figure 4:
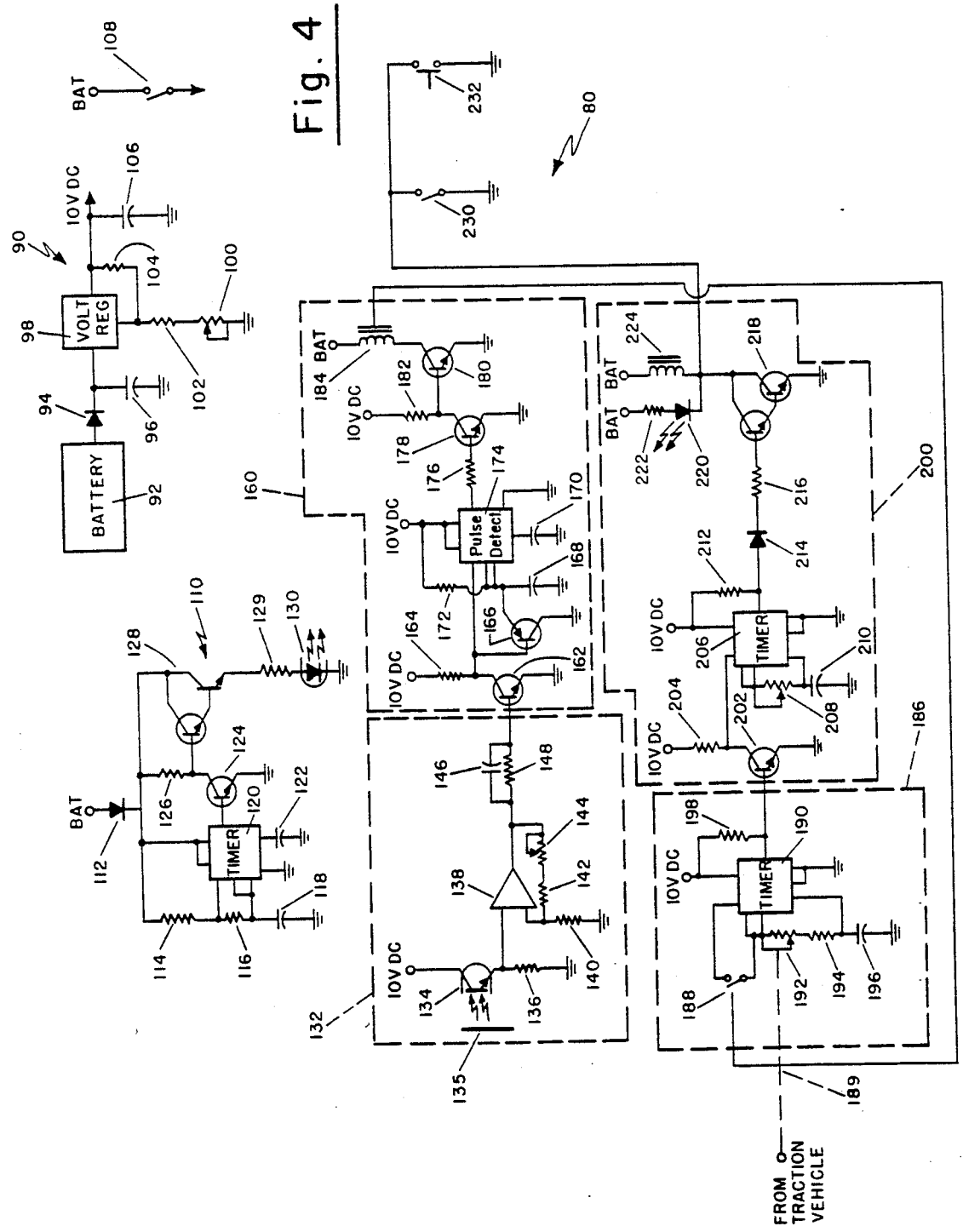
FIG. 4 is a simplified schematic and block diagram of a spraying system control circuit for use in the crop spraying system of the present invention.

Referring to FIG. 1, there is shown a crop spraying system 10 in accordance with the principles of the present invention. The crop spraying system 10 is adapted for mounting to an implement frame 16 drawn by a traction vehicle 12. Although not shown, the crop spraying system 10 is equally adapted for attachment directly to a traction vehicle which may be dedicated to crop spraying. An aft wheel of the traction vehicle 12 is shown as element 14. The traction vehicle 12 is coupled to the implement frame 16 in a conventional manner such as by means of a three-point hitch, which is not shown for simplicity. The implement frame 16 includes a toolbar 17 and a plurality of wheels 18 (only one of which is shown) for riding on the soil and supporting the implement frame. For simplicity, only one-half of the implement frame 16 is shown in the figure. A corresponding portion of the implement frame 16 would be positioned to the left of the portion of the implement frame shown in FIG. 1 so that the implement frame would extend symmetrically on both sides of a centerline of the traction vehicle 12. Thus, another wheel such as that shown as element 18 in the figure would be positioned to the left of the traction vehicle's centerline and the implement frame would include components on the left side of the traction vehicle corresponding to those shown in the figure. The crop spraying system 10 shown in FIG. 1 is adapted for treating six crop rows, with only half of that number, or three, shown in the figure for simplicity.

The crop spraying system 10 includes a controller 20 shown in dotted line form in the figure. The controller 20 is coupled by means of a plurality of electrical leads 74 to first, second and third solenoid valves 52, 54 and 56. Each of these solenoid valves is coupled to a respective one of a plurality of spray nozzles 46, 48 and 50 positioned on an aft portion of the implement frame 16. The controller 20 includes operator responsive controls and electrical circuitry such as shown in FIG. 4 and described in detail below. The controller 20 is preferably located in the traction vehicle's cab or adjacent to where an operator of the traction vehicle sits to allow the operator to control the crop spraying system 10 with the traction vehicle in motion, or on-the-go. Quick release electrical couplers (not shown in the figure for simplicity) could be used to couple the controller 20 to the electrical leads 74 on the implement frame 16 to allow for removal of the implement frame from the traction vehicle 12. These quick release electrical couplers could take the form of clip- or plug-like connectors.

Attached to the implement frame 16 are a plurality of spaced discs 28 and plow shanks 30. Each disc 28 and plow shank 30 combination is positioned in the inter-row space for engaging the soil between adjacent rows. The disc and plow combinations loosen the soil and sever unwanted growth such as weeds between adjacent crop rows. Although shown in the figure as employed with cultivating implements, the crop spraying system 10 may be used by itself in a crop spraying application.

The crop spraying system 10 includes a tank 22 attached to the implement frame 16 and containing a herbicide. The tank 22 is coupled by means of an array of tubes or hoses 40 to first, second and third solenoid valves 52, 54 and 56. As described above, each of the solenoid valves 52, 54 and 56 is coupled by means of the electrical leads 74 to the system controller 20. Each of the first, second and third solenoid valves 52, 54 and 56 is further respectively coupled to the first, second and third spray nozzles 46, 48 and 50. The tubing network 40 includes a cross-tube 42 from which extend three stub tubes 44. Each of the stub tubes 44 is coupled to one of the spray nozzles by means of an associated solenoid valve. Herbicide stored in tank 22 is delivered to each of the first, second and third spray nozzles 46, 48 and 50 by means of this tube or hose arrangement. It should be noted that the first, second and third spray nozzles 46, 48 and 50 are respectively disposed directly above first, second and third crop rows 24a, 24b and 24c.

Also coupled to an intermediate portion of the implement frame 16 are three pairs of aligned first and second tube sections 60 and 62. Each of the paired first and second tube sections 60, 62 is positioned forward of a respective spray nozzle and above a respective one of the crop rows 24a, 24b and 24c. Disposed within the first and second tube sections 60, 62 are an optical transmitter and receiver as described in detail below. Each pair of optical transmitter and receiver is also coupled to the controller 22 by means of electrical leads 74. In one embodiment, the transmitter directs an infrared (IR) beam 64 above a crop row to its associated receiver. As shown for the case of the first crop row 24a, a weed 61 extending above the crop row interrupts the IR beam 64 indicating the presence of the weed and causing the third spray nozzle 50 to momentarily discharge herbicide on the weed. The third solenoid valve 56 is actuated by the controller 20 following a given time delay determined by the spacing between the first and second tube sections 60, 62 and the third spray nozzle 50 and the speed of the traction vehicle.

Referring to FIG. 2, there is shown a simplified sectional view of the first and second tube sections 60 and 62 within which are respectively disposed an IR transmitter 66 and receiver 70. The IR transmitter 66 is coupled to the system controller by means of a pair of transmitter leads 68. Similarly, the IR receiver 70 is coupled to the system controller by means of a pair of receiver leads 72. The IR transmitter 66 is in the form of a photo diode emitter, while the IR receiver 70 is a photo transistor. With each of the IR transmitter and receiver 66, 70 positioned within a respective tube section 60, 62, and with the two tube sections in alignment along a common axis, an IR beam 64 is formed at the output of the transmitter and directed to the receiver. Positioning the IR receiver 70 within the second tube section 62 renders it responsive only to IR radiation which enters the open end of the tube. Thus, ambient IR radiation from the atmosphere is substantially prevented from reaching the IR receiver 70 by the second tube section 62 as shown by ambient radiation arrows in the figure. This arrangement eliminates IR background noise and increases the sensitivity of the crop spraying system 10 to the presence of unwanted plants in a crop row. In a preferred embodiment, the second tube section 62 disposed about the IR receiver 70 is provided with a flat black surface for absorbing background IR radiation and improving system sensitivity. Also in a preferred embodiment, the first and second tube sections 60, 62 are integrated in a common structure which is adapted for mounting to the implement frame 16 to facilitate alignment between the transmitter and receiver.

Referring to FIG. 3, there is shown another optical arrangement for use in the crop spraying system of the present invention. In the arrangement of FIG. 3, an IR transmitter 35 directs an IR beam shown in dotted line form onto a plurality of planar reflectors 37, 38, 39 and 41 which, in turn, direct the IR beam to an IR receiver 36. The IR beam is thus directed above the soil 34 and adjacent to side and upper portions of a row crop 32. By directing the IR beam adjacent to lateral portions of the row crop 32, a weed 33 which extends beyond lateral portions of the row crop, but not above the row crop, can be detected. The first, second, third and fourth reflectors 37, 38, 39 and 41 can be securely mounted to the implement frame by conventional means which are not shown in the figure for simplicity. Although the arrangement of FIG. 3 makes use of a plurality of spaced planar reflectors, this embodiment of the present invention is not limited to this type of optical element, but may also include other well known optical arrangements such as including prisms, light pipes, focusable mirrors, etc., for bending the beam around the crop row.

Referring to FIG. 4, there is shown a combined block and schematic diagram of a spraying system control circuit 80 for use in the crop spraying system of the present invention. The spraying system control circuit 80 includes a power supply 90, a transmitter 110, a receiver 132, a missing pulse detector 160, an event delay timer 186, and an event timer 200.

Power supply 90 is coupled to each of the transmitter 110, receiver 132, missing pulse detector 160, event delay timer 186, and event timer 200. In a preferred embodiment, power supply 90 provides 10 VDC to each of the aforementioned circuits of the spray system controller 80. Power supply 90 is energized by the battery 92 of the traction vehicle. The DC output from battery 92 is provided via diode 94 and a grounded capacitor 96 to a voltage regulator 98, which in a preferred embodiment is an LM 317MP voltage regulator. Diode 94 protects the spraying system control circuit 80 from damage as a result of being accidentally wired backwards to the battery 92. A potentiometer 100 and a fixed resistor 102 are serially coupled to voltage regulator 98. The potentiometer 102 allows for precise manual adjustment of power supply output to 10 VDC. The regulated 10 VDC output from the voltage regulator 198 is filtered by means of a combination of resistor 104 and capacitor 106. A manual ON/OFF switch 108 is provided in the power supply 90 to allow for turning the crop spraying system ON and OFF.

A transmitter circuit 110 is coupled to the battery via a diode 112. Diode 112 protects the transmitter circuit 110 from damage from accidentally being wired to the battery 92 backwards. The transmitter circuit 110 includes a timer 120. Resistors 114 and 116 and capacitor 118 program the timer 120 for a pulsed output of 0.0001 seconds off, followed by 0.002 seconds on. Timer 120 is an LM 555 timer integrated circuit (IC) in a preferred embodiment. A grounded capacitor 122 is also coupled to timer 120. The pulsed output of timer 120 is provided to the base of an NPN transistor 124, to the collector of which is coupled a resistor 126. The pulsed output of the timer 120 is inverted by transistor 124 and resistor 126 so that the signal is OFF for 0.0001 seconds and then ON for 0.002 seconds. This inverted signal is then provided to the base of a transistor 128 which is coupled to and drives a photo diode 130 via resistor 129. Resistor 129 limits the current through photo diode 130 to approximately 1 amp. The pulsed input to photo diode 130 causes it to emit a pulse of infrared (IR) radiation.

The IR pulse is provided to and received by a photo transistor 134 in the receiver circuit 132. Light incident upon the base of photo transistor 134 renders it conductive. In the OFF state, the emitter of photo transistor 134 is clamped to ground via resistor 136. Photo transistor 134 is provided with a filter 135 in a preferred embodiment allowing it to recognize only a light frequency that is in the near infrared range (800-1100 nanometers), which is not within the range of human eyesight (typically 500-600 nanometers). Essentially all other radiated energy, such as from green plants or other colored objects, appear to be black to photo transistor 134. Because the selective filtering of photo transistor 134 is not perfect and the sun emits light of a frequency to which photo transistor 134 is sensitive, the photo transistor is typically always in a partially ON state when used in daylight. However, so long as the pulsed intensity of photo diode 130 exceeds the ambient light energy, the receiver circuit 132 is responsive only to the desired signals outputted by the transmitter circuit 110.

The pulsed output from photo transistor 134 is provided to an amplifier 138 for amplifying the received optical signal to the desired level. The signal is then coupled to a transistor 162 through a capacitor 146 and resistor 148. Capacitor 146 and resistor 148 allow the signal to electrically float in such a way that the peak pulsed energy will always rise to approximately 8 volts. The combination of fixed resistors 140 and 142 and a potentiometer 144 is coupled across amplifier 138 which allows the output of the receiver circuit 132 to be set at 8 volts.

Transistor 162 forms the input stage of the missing pulse detector circuit 160 and together with resistor 164 inverts the signal and provides it to a pulse detector 174. Pulse detector 174 is set to a pulse rate frequency which is slightly longer in time than the received pulse rate frequency. If pulse detector 174 times out completely, the signal at its output pin will change state. This is prevented because the input trigger to pulse detector 174 is constantly restarting the pulse detector by turning ON a PNP reset transistor 166. When an object interrupts the IR beam transmitted to the photo transistor 134, one or more pulses of energy will not be received at the reset transistor 166 which interrupts the resetting of pulse detector 174. This allows the output pin of pulse detector 174 to go from a high to a low level. Transition of the output of pulse detector 174 from a high to a low level, in turn, drives the collector of transistor 178 to a high level, turning ON transistor 180. When transistor 180 turns ON, relay 184 is momentarily energized. Resistor 176 couples the output of pulse detector 174 to the base of transistor 178, while resistor 182 couples its collector to the 10 VDC source. Pulse detector 174 in one embodiment is an LM 555 timer.

The output of the missing pulse detector circuit 160 is provided from relay 184 to relay contacts 188 in the event delay timer circuit 186. Because the optical sensors are positioned forward of the spray nozzle as the crop spraying system 10 is pulled by a traction vehicle, it is necessary to provide a time delay between detecting an event, such as a weed in a crop row, and reacting to that same event. This is accomplished by means of event delay timer circuit 186. When relay contacts 188 are momentarily energized following receipt of an output from the missing pulse detector circuit 160, it initiates a timing cycle in a timing circuit 190. The timing cycle, or delay, is determined by potentiometer 192, resistor 194 and capacitor 196 coupled to the timing circuit 190. Potentiometer 192 permits the time delay to be manually set depending upon the spacing between the detector and spray nozzle and the speed of the traction vehicle. When the event delay timer circuit times out, the output from timer circuit 190 switches from a high state to a low state and is provided to an NPN transistor 202 in the event timer circuit 200. Resistor 198 is coupled between 10 VDC and the output of timer circuit 190. Provision may be made for automatically compensating for traction vehicle speed by providing an input from the traction vehicle's speedometer or other tractor-mounted speed detector directly to timer circuit 190 as shown in dotted line form by line 189 in the figure. Potentiometer 192 could then be removed with the space time delay between sensor and spray nozzle compensated for by resistor 194 and capacitor 196.

The output of NPN transistor 202 is provided to an input of a timer circuit 206. The input of timer circuit 206 and the collector nf NPN transistor 190 are coupled to the 10 VDC source via resistor 204. Potentiometer 208 and capacitor 210 coupled to the timer circuit 206 establish a time delay of timer circuit 206, its output pin immediately goes high for 0.2 seconds and then transitions low. By changing the resistive value of potentiometer 208 the time the output pin of timer circuit 206 is high may be set to a selected duration. In this way the time the spray nozzles are ON may be adjusted as desired. Potentiometer 208 may be replaced with a multi-position resistive switch to permit the ON time of the spray nozzles to be selected in an incremental rather than continuous manner. The output of the timer circuit 206 is coupled via resistors 212 and 216 and a diode 214 to a transistor 218. When the output of the timer circuit 206 goes low, transistor 218 is turned ON which activates a spray nozzle solenoid 224 coupled to the collector of the transistor. The output of transistor 218 activates the spray nozzle solenoid 224 and turns on an ON/OFF light emitting diode (LED) 220 for 0.2 seconds. The anode of LED 220 is coupled to the battery via a resistor 222.

Coupled to the solenoid 224 and ON/OFF LED 220 in the event timer circuit 200 is an all sprayer manual override switch 230 as well as a selective sprayer manual override switch 232. Actuation of the all sprayer manual override switch 230 turns ON all spray nozzles until the switch is open. Actuation of the selective sprayer manual override switch 232 turns on only selective spray nozzles, as desired, and switches them OFF when the switch is released, or opened. Thus, there is one all sprayer manual override switch 230 for the entire spraying system control circuit 80, while there is one selective sprayer manual override switch 232 for each spray nozzle in the crop spraying system.

There has thus been shown a crop spraying system which employs a plurality of optical sensors, one for each crop row, for detecting any unwanted plants, such as weeds, in the crop row which extend above or beyond side portions of the crops in the row. Following detection of an unwanted plant in the crop row, a delay timer momentarily turns on the appropriate spray nozzle covering that row after a selected time interval depending upon sensor and nozzle spacing and traction vehicle speed allowing for the discharge of a herbicide from the nozzle onto the unwanted plant. By selectively spraying only unwanted plants in the crop row, herbicide usage is substantially reduced and the environmental impact of the herbicide is minimized.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. For use on a frame structure pulled by a traction vehicle, apparatus for spraying an unwanted plant such as a weed in a row of crop plants, wherein said unwanted plant is larger than said crop plants, said apparatus comprising:

a tank containing a herbicide;

a spray nozzle mounted to the frame structure and connected to said tank for receiving the herbicide;

optical sensor means mounted to the frame structure forward of said spray nozzle and positioned adjacent to the crop row for detecting an unwanted plant and providing a signal upon detection of an unwanted plant, said optical sensor means including a light transmitter and receiver combination;

first and second aligned linear tubes respectively disposed about said light transmitter and said light receiver for directively transmitting the light in the form of a beam and for directively receiving said light beam, wherein said first and second tubes are disposed adjacent respective lateral portions of the crop row and wherein said alignment means further includes reflector means for directing the transmitted light beam immediately above the crop row and adjacent to opposed lateral portions of the crop row; and control means coupled to said spray nozzle and to said sensor means and responsive to said signal for momentarily actuating said spray nozzle for spraying the unwanted plant with the herbicide, said control means including timing means for delaying the spraying of the unwanted plant a predetermined time period determined by the speed of the traction vehicle and the spacing between said spray nozzle and said optical sensor means.

2. The apparatus of claim 1, wherein said optical sensor means includes an infrared transmitter and receiver combination.

3. The apparatus of claim 2, wherein said infrared transmitter comprises a photo diode emitter and said receiver comprises a photo transistor.

4. The apparatus of claim 1, wherein said second tube includes an inner black surface.

5. The apparatus of claim 1, wherein said first and second tubes are disposed above and on respective sides of the crop row.

6. The apparatus of claim 1, wherein said reflector means includes a plurality of spaced reflectors disposed adjacent to and about the crop row.

7. The apparatus of claim 1 further comprising manual switch means coupled to said control means for actuating said spray nozzle and spraying an unwanted plant of a size not detectable by said optical sensor means.

8. The apparatus of claim 1, wherein said timing means includes first adjustable input means for changing said predetermined time period as the speed of the traction vehicle changes.

9. The apparatus of claim 1, wherein said control means further includes second adjustable input means for changing the duration of actuation of said spray nozzle.

10. For use with a crop sprayer attached to a traction vehicle moving at a given speed generally parallel to a row of crop plants for spaying said crop plants, wherein said crop sprayer includes a sprayer nozzle and a tank containing a herbicide attached to said sprayer nozzle, a controller comprising:

an optical transmitter for directing an optical beam in close proximity to the row of crop plants;

an optical receiver aligned with said optical transmitter for receiving said optical beam, wherein the optical transmitter and receiver combination is disposed forward of the sprayer nozzle along a direction of travel of the traction vehicle;

alignment means for directively transmitting said optical beam from said optical transmitter to said optical receiver in close proximity to said row of crop plants, said alignment means including reflector means for directing said optical beam immediately above and adjacent to opposed lateral portions of said row of crop plants;

detector means coupled to said optical receiver for detecting an interruption of said optical beam when said optical beam is incident upon an unwanted plant within said row of crop plants, wherein said unwanted plant is larger than said crop plants; and timer means coupled to the sprayer nozzle and to said detector means and responsive to detection of an interruption of said optical beam for momentarily actuating the sprayer nozzle and spraying the unwanted plant with herbicide following a predetermined time delay after detection of an interruption of said optical beam, wherein said predetermined time delay is determined by traction vehicle speed and spacing between said optical transmitter and receiver combination and the sprayer nozzle.

11. The apparatus of claim 10, wherein said timer means includes first adjustable input means for changing said predetermined time delay as the speed of the traction vehicle changes.

12. The apparatus of claim 11, wherein said timer means further includes second adjustable input means for changing the duration of actuation of said spray nozzle.

13. The apparatus of claim 10, wherein said optical transmitter and receiver combination includes an infrared transmitter and receiver combination.

14. The apparatus of claim 13, wherein said infrared transmitter comprises a photo diode emitter and said receiver comprises a photo transistor.

* * * * *

UNITED STATES PATENT AND TRADEMARK OFFICE
CERTIFICATE OF CORRECTION

PATENT NO. : 5,222,324

DATED : June 29, 1993

INVENTOR(S) : Donald L. O'Neall and John R. Sandford

It is certified that error appears in the above-identified patent and that said Letters Patent is hereby corrected as shown below:

Col. 2, line 59, after "implement frame", --16-- should be inserted;

Col. 6, line 54, "nf" should be --of--; and on line 57, after "time delay of", the following should be inserted:

-- timer circuit. Thus, when a signal is provided to the input of --

Signed and Sealed this

Twenty-second Day of March, 1994

Attest:

BRUCE LEHMAN

Attesting Officer

Commissioner of Patents and Trademarks